United States Patent [19]

Ramer

[11] 4,406,484
[45] Sep. 27, 1983

[54] MANHOLE FLUID LINE ATTACHMENT APPARATUS

[76] Inventor: James L. Ramer, Rte. 1, Box 382, Whitestown, Ind. 46075

[21] Appl. No.: 240,724

[22] Filed: Mar. 5, 1981

[51] Int. Cl.³ ............................................ F16L 55/00
[52] U.S. Cl. .................................... 285/178; 285/192; 285/346; 52/21
[58] Field of Search ............... 285/178, 177, 230, 192, 285/346; 52/20, 21

[56] References Cited

U.S. PATENT DOCUMENTS

| | | | |
|---|---|---|---|
| 689,624 | 12/1901 | Ryan | 285/346 X |
| 2,295,416 | 9/1942 | Madison | |
| 2,950,837 | 8/1960 | Christensen et al. | |
| 3,148,900 | 9/1964 | Larson | |
| 3,348,850 | 10/1967 | Scales | 285/230 X |
| 3,385,012 | 5/1968 | Lovegreen | |
| 3,551,007 | 12/1970 | Martin et al. | |
| 3,643,580 | 2/1972 | Siegel | |
| 3,759,280 | 9/1973 | Swanson | |
| 3,788,080 | 1/1974 | Washabaugh et al. | |
| 3,829,135 | 8/1974 | Forni | 285/230 X |
| 4,162,092 | 7/1979 | Hayes | 285/177 X |
| 4,298,470 | 11/1981 | Stallings | 285/178 X |

*Primary Examiner*—Dave W. Arola
*Attorney, Agent, or Firm*—Darrell E. Hollis

[57] ABSTRACT

An apparatus for attaching a fluid line to a manhole includes a ring having an eccentric hole therein through which the fluid line passes. The ring is attachable in a circular mounting ring in the manhole whereby rotation of the ring adjusts the level at which the eccentrically located aperture is disposed and thus adjusts the height of entry of the fluid line. Sealing against fluid leakage is provided by a compression member which is compressed and sealed during attachment of the ring.

7 Claims, 3 Drawing Figures

MANHOLE FLUID LINE ATTACHMENT APPARATUS

GOVERNMENT INTEREST

The invention described herein may be manufactured, used and licensed by or for the Government for governmental purposes without the payment to me of any royalties thereon.

BACKGROUND OF THE INVENTION

The present invention relates to manholes and, more particularly, to fluid line attachment apparatus for manholes.

Manholes typically include precast, or fabricated in place, manhole structures which include at their bottoms manhole influent and effluent lines for entering fluid into and removing it from the manhole.

It has been the practice to provide manholes with a pair of apertures having diameters larger than the largest type of influent/effluent lines to be used with the manhole and then to seal the influent and effluent lines to the openings by cementing with mortar. Such a procedure is imprecise with regard to aligning the levels of influent and effluent lines and, in addition, requires a great amount of labor to produce a secure and water tight joint.

If influent and effluent lines are not in correct vertical alignment, and particularly if a level of the influent line is below the level of the effluent line, ponding or fluid retention occurs within the manhole and/or the line. Proper vertical alignment is normally complicated by the fact that influent and effluent lines may differ in diameter at a particular manhole.

OBJECTS AND SUMMARY OF THE INVENTION

Accordingly, it is an object of the present invention to provide a manhole fluid line attachment apparatus which overcomes the drawbacks of the prior art.

It is a further object of the invention to provide a manhole fluid line attachment apparatus which permits rapid sealing of an influent or effluent line to a manhole.

It is a further object of the invention to provide a manhole fluid line attachment apparatus which permits accurate adjustment of vertical height of influent and effluent lines.

According to an aspect of the present invention, there is provided an apparatus for attaching a fluid line to a structure comprising a mounting ring in the structure, the mounting ring having an abutment surface thereon, at least one ring having an aperture eccentrically disposed therein, the aperture having a diameter large enough to permit passage of the fluid line therethrough, first means for sealing the at least one ring to the abutment surface, and second means for sealing the at least one ring to a fluid line passing through the aperture whereby a substantially fluid-tight attachment of the fluid line to the structure is achieved.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
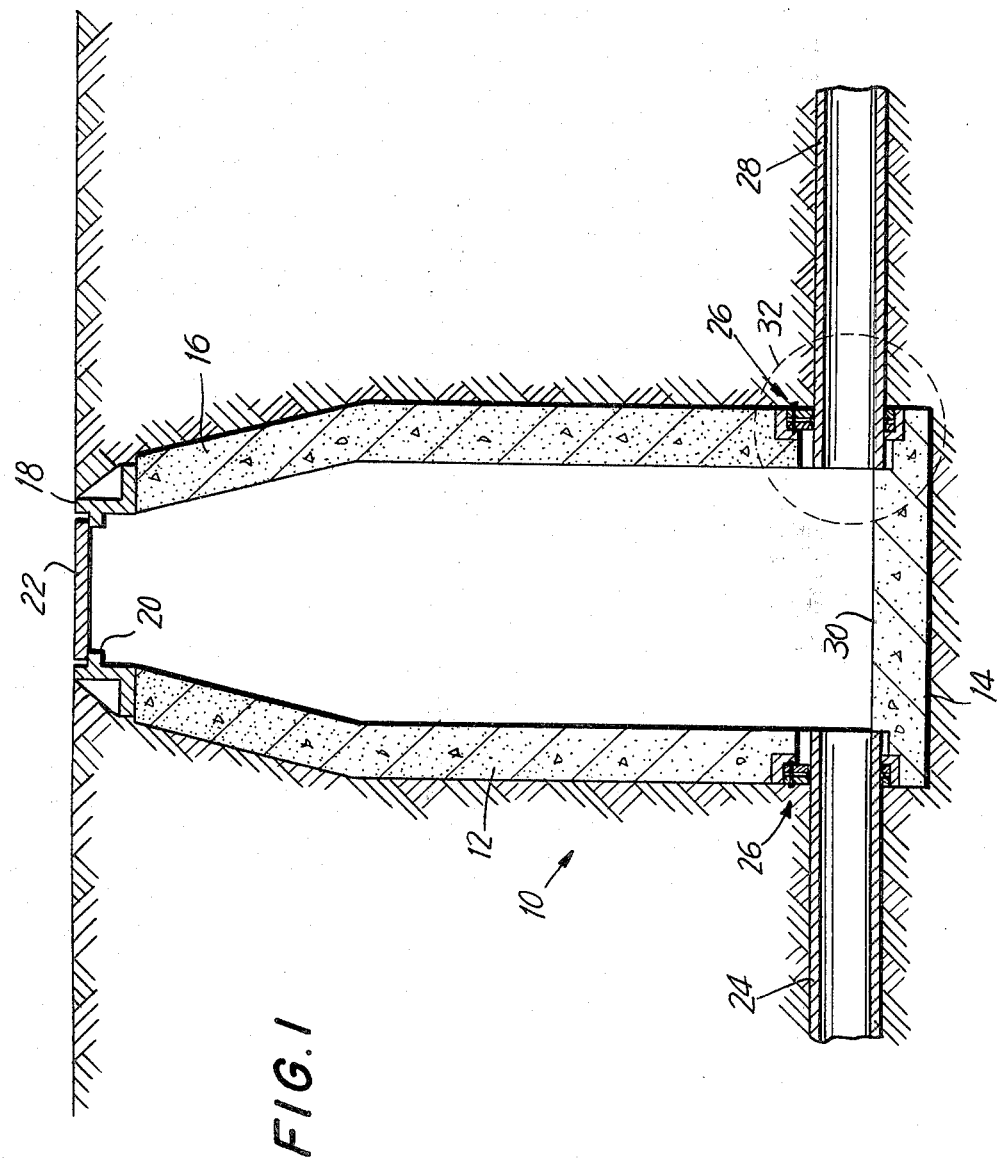
FIG. 1 is a cross section of a manhole including fluid line attachment apparatus according to the present invention.

Referring now to FIG. 1, there is shown, generally at 10, a manhole including a generally cylindrical lower part 12 closed by a horizontal or graded bottom 14 and being joined at its top by a frustum of a cone 16 which is capped by a manhole cover frame 18 to define an access opening 20. A manhole cover 22 rests upon manhole cover frame 18.

Except for manhole cover frame 18 and manhole cover 22, the remainder of manhole 10 described hereinabove may be of any suitable material such as precast concrete illustrated in FIG. 1 or, alternately, may be of metal, cast in place concrete, glass fibers, masonry, vitreous and other materials. The portions of manhole 10 described above are conventional and do not form a part of the present invention.

An influent line 24 carries water and/or sewage into manhole 10 through a line attachment 26, to be more fully described hereinafter. An effluent line 28, attached to manhole 10 by a second line attachment 26, bears off the fluid from manhole 10.

An upper surface of horizontal or graded bottom 14 defines a floor or invert 30. For correct alignment of influent line 24 and effluent line 28 with minimum ponding in manhole 10, it is desirable that the bottom of the inner diameter of influent line 24 and the bottom of the inner diameter of effluent line 28 be aligned with floor 30.

Figure 2:
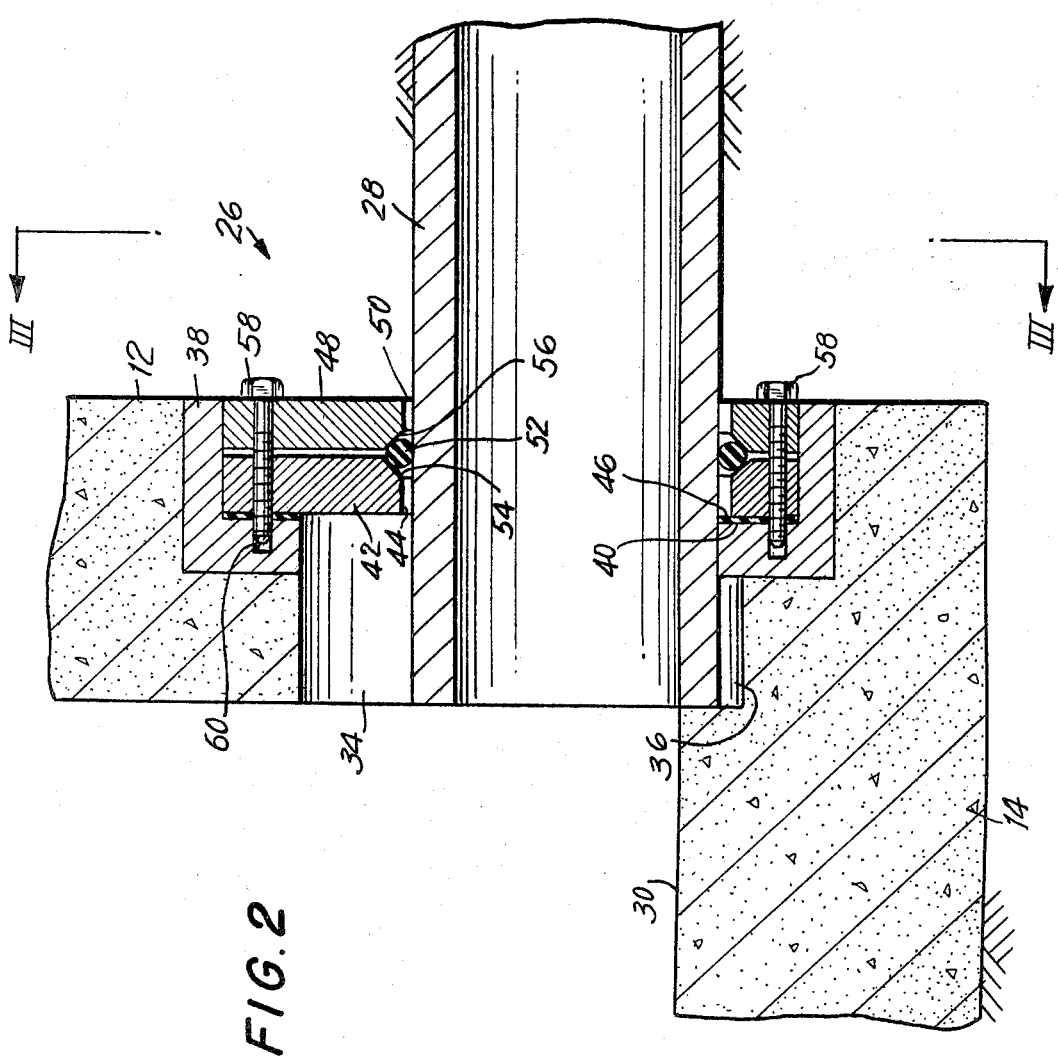
FIG. 2 is an enlarged view of a portion of FIG. 1 enclosed in dashed line showing the fluid line attachment apparatus in greater detail.

The portion of FIG. 1 enclosed in a dashed circle 32 is shown in greater detail in FIG. 2 to which reference is now made. Line attachment 26 includes a generally circular aperture 34 in the side of lower part 12. Aperture 34 includes a step 36 depressed below floor 30 to leave clearance for the thickness of effluent line 28 or influent line 24 below the level of floor 30.

A mounting ring 38 of any convenient material such as, for example, of metal is preferably integrally mounted in lower part 12 surrounding aperture 34. Mounting ring 38 includes a circular abutment surface 40.

An inner ring 42, having a circular aperture 44 eccentrically disposed therein, is fitted against abutment surface 40 with a resilient sealing ring 46 disposed between abutment surface 40 and ring 42 to prevent leakage of fluid therepast.

An outer ring 48, having a circular aperture 50 eccentrically disposed therein, is mounted face to face with inner ring 42. Circular apertures 44 and 50 are aligned as shown to permit the passage therethrough of effluent line 28 or influent line 24.

A compression sealing member such as an O ring 52 is disposed in a V-shaped channel formed by facing chambers 54 and 56 at edges of circular apertures 44 and 50, respectively. Attachment means such as, for example, a plurality of bolts 58 passing through rings 42 and 48 may be tightened into threaded bores 60 in mounting ring 38 to compress O ring 52 and sealing ring 46.

Figure 3:
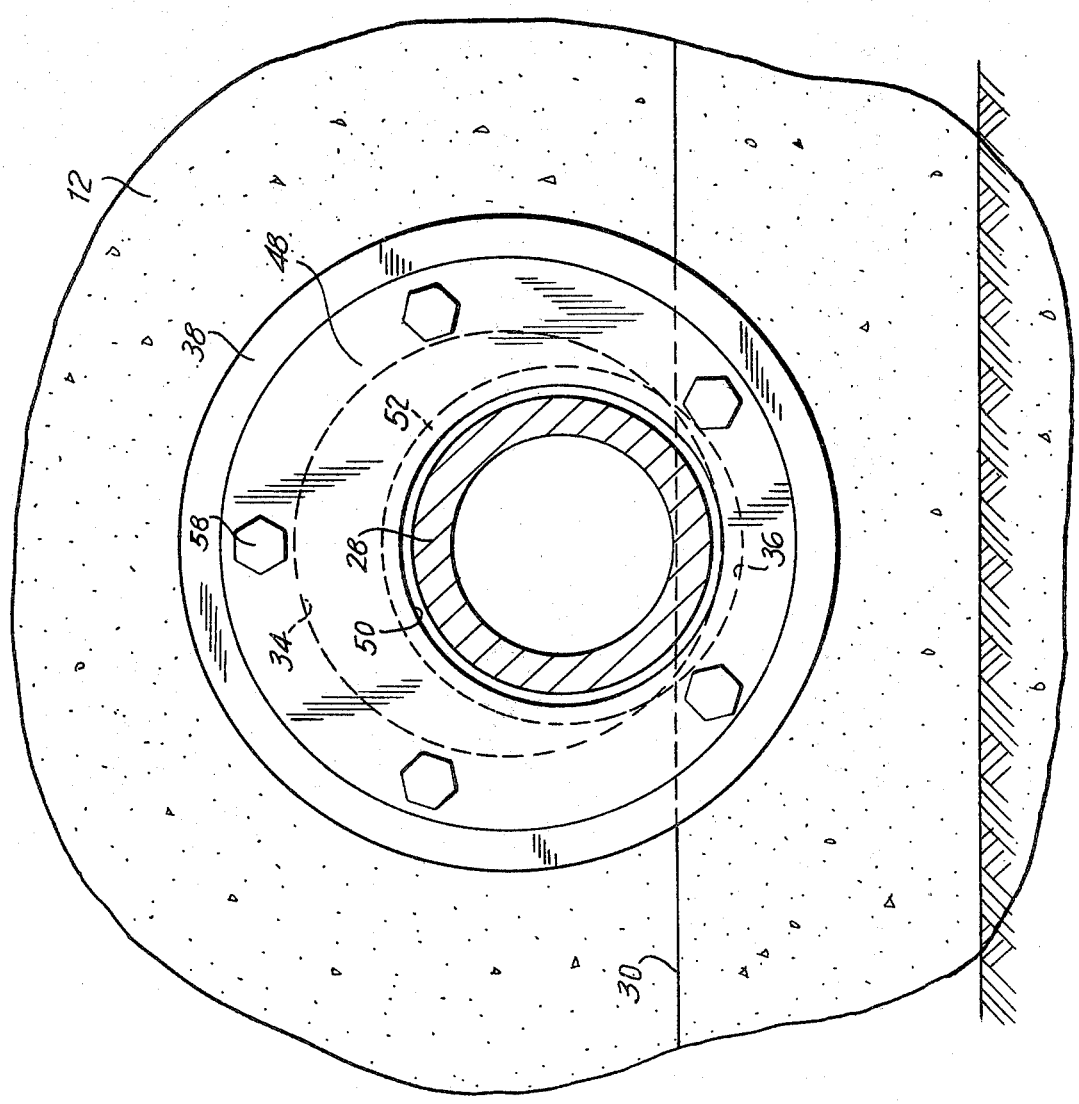
FIG. 3 is a cross section taken along III—III in FIG. 2.

Referring now to FIG. 3, outer ring 48 is shown rotated so that its circular aperture is at its lowest level which, in FIG. 3, places the bottom of the inside of effluent line 28 or influent line 24 coincident with the level of floor 30. In the light of the disclosure herein, it would be clear that the level at which effluent line 28 enters the manhole can be adjusted by rotating outer ring 48 and inner ring 42 (not shown in FIG. 3) to positions which move circular apertures 50 and 44 (not shown in FIG. 3) to a higher level. Bolts 58 may thereupon be employed to secure the assembly together at the higher or lower level.

The previously described apparatus provides for discrete levels at which effluent line may be attached to the manhole. Alternatively, instead of bolts 58 passing through holes in rings 48 and 42, they may pass through arcuate slots which would permit a substantial range of adjustments. A complete range of adjustment could be accomplished by moving bolts 58 slightly outside the perimeters of rings 42 and 48 and provide clamping of the rings by overhang of the heads of bolts 58.

In order to accommodate different sizes of effluent line 28, a plurality of rings 42 and 48 may be made available as a kit from which the proper sizes for a particular manhole may be selected.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for attaching a fluid line to a structure having a bottom comprising:
   a. a mounting ring in said structure, said mounting ring having an abutment surface thereon;
   b. at least one ring having an aperture eccentrically disposed therein, said aperture having a diameter large enough to permit passage of a fluid line therethrough, said aperture being disposed to secure a fluid line in a position where a lowest point on an inside surface of the fluid line is substantially aligned with the bottom of the structure whereby ponding in said structure is substantially avoided;
   c. first means for sealing said at least one ring to said abutment surface; and
   d. second means for sealing said at least one ring to a fluid line passing through said aperture whereby a substantially fluid-tight attachment of the fluid line to said structure is achieved.

2. Apparatus according to claim 1, wherein said first means for sealing includes means for disposing said ring in at least two rotational orientations whereby said aperture may be selectively disposed in at least two different heights.

3. Apparatus according to claim 1, wherein said first means includes a resilient sealing ring between said at least one ring and said abutment surface and means for clamping said at least one ring against said resilient sealing ring.

4. Apparatus according to claim 1 or 3, wherein said second means includes an O ring about said aperture and means for compressing said O ring into sealing contact with said at least one ring and said fluid line.

5. Apparatus according to claim 4, wherein said means for compressing includes a second ring having a second aperture eccentrically disposed therein, said second ring being substantially the same as the first-mentioned ring, said O ring being disposed between said first-mentioned and said second rings, said first means for sealing being effective to draw said first-mentioned and said second rings together thereby compressing said O ring.

6. A manhole fluid line attachment apparatus, the manhole being of the type having a bottom and a substantially vertical lower part joined to the bottom comprising:
   a. the lower part having a circular aperture therein at least as much lower than a top surface of said bottom as a thickness of material forming a fluid line;
   b. a mounting ring embedded in said lower part surrounding said circular aperture, said mounting ring including an abutment surface;
   c. a first ring having a first circular aperture eccentrically disposed therein, said first circular aperture permitting the fluid line to pass therethrough;
   d. a second ring having a second circular aperture eccentrically disposed therein, said second circular aperture being aligned with said first circular aperture and permitting the fluid line to pass therethrough, said first and second circular apertures are effective to secure a fluid line in a position where a lowest point on an inside surface of the fluid line is substantially aligned with a top surface of the bottom whereby ponding in the manhole is substantially avoided;
   e. means for forcing said first and second rings together;
   f. an O ring between said first and second rings, said O ring being compressible into sealing contact with a fluid line and at least said first ring by forcing said first and second rings together;
   g. a sealing ring on said abutment surface; and means for forcing said first ring into sealing contact with said sealing ring whereby a substantially fluid-tight attachment for a fluid line to a manhole is achieved.

7. A manhole fluid line attachment apparatus according to claim 6, wherein said bottom is horizontal.

* * * * *